United States Patent

Maki

[11] Patent Number: 5,986,702
[45] Date of Patent: *Nov. 16, 1999

[54] SOLID STATE IMAGE PICKUP DEVICE

[75] Inventor: Yasuhito Maki, Kanagawa, Japan

[73] Assignee: Sony Corporation, Tokyo, Japan

[*] Notice: This patent is subject to a terminal disclaimer.

[21] Appl. No.: 09/067,799

[22] Filed: Apr. 28, 1998

Related U.S. Application Data

[63] Continuation of application No. 08/452,578, May 25, 1995.

[30] Foreign Application Priority Data

May 27, 1994 [JP] Japan .................................. 6-138152

[51] Int. Cl.$^6$ ........................................................ H04N 5/217
[52] U.S. Cl. ............................................ 348/241; 348/372
[58] Field of Search .................................. 348/241, 311, 348/294, 314, 348, 372; 250/578; 358/213

[56] References Cited

U.S. PATENT DOCUMENTS 3,800,169   3/1974   Diaz ......................................... 327/262
5,083,207   1/1992   Ishida et al. ............................. 348/314

Primary Examiner—Wendy Garber
Assistant Examiner—Christopher Onuaku
Attorney, Agent, or Firm—Frommer Lawerence & Haug, LLP.; William S. Frommer

[57] ABSTRACT

A solid state image pickup device comprising; a sensor section having a plurality of light-receiving regions arranged in plurality in which each of the light-receiving regions converts an incident light into signal charges of an amount corresponding to the amount of light, a charge transfer register for transferring the signal charges read out from each of the light-receiving regions of the sensor section, a charge discharging section for discharging charges stored in each of the light-receiving regions of the sensor section, and a control means for controlling such that charge stored in each of the light-receiving regions are discharged to the charge discharging section within a predetermined period of time upon rising of the power supply.

7 Claims, 5 Drawing Sheets

SOLID STATE IMAGE PICKUP DEVICE

This application is a continuation of application Ser. No. 08/452,578 filed May 25, 1995.

BACKGROUND OF THE INVENTION

1. Field of the Invention

The present invention relates a solid state image pickup device referred to as a linear sensor (line sensor) or an area sensor and more particular to a solid state image pickup device suitable to use as an image sensor for a bar-code reader for reading a bar code appended to a medium such as a commercial product.

2. Description of Related Art

FIG. 10 shows an example of a solid state image pickup device, for example, a CCD linear sensor. The CCD linear sensor comprises a sensor row 102 having a plurality of light-receiving regions 101 arranged in one row for converting an incident light into signal charges of an amount corresponding to the amount of the light and storing them and a charge transfer register 104 comprising a CCD for transferring in one direction the signal charges read out by way of a readout gate 103 from each of the light-receiving regions 101 of the sensor row 102.

The readout gate 103 reads out the signal charges stored in each of the light-receiving regions 101 of the sensor row 102 simultaneously upon application of a readout pulse $\phi$ROG. The charge transfer register 104 transfers the signal charges under 2-phase driving by 2-phase transfer clocks $\phi$H1 and $\phi$H2.

A charge/voltage conversion section 105, for example, of a floating diffusion constitution is formed at the final stage of the charge transfer register 104 for detecting the transferred signal charges into a voltage. The output voltage of the charge/voltage conversion section 105 is led out by way of a buffer 106 from an output terminal 107 as a CCD output.

The CCD linear sensor having the above-mentioned constitution is used as an image sensor of a bar-code reader for reading a bar code appended, for example, on a medium such as a commercial product.

By the way, since the linear sensor is in a thermally balanced state before turning on of a power supply and, the light-receiving regions 101 are overflown with charges in the balanced state, pixel signals cannot be read out normally owing to the presence of unnecessary initial charges immediately after the turning on of the power supply (rising of power supply). That is, the pixel signals cannot be read out normally unless the unnecessary charges are discharged, so that start up of the device is delayed.

Since such unnecessary initial charges are increased as the aperture of the sensor section (sensor area) is greater, unnecessary charges in the light-receiving regions 101 cannot be discharged during usual transfer operation unless charges are read-out and transferred repeatedly for several to several tens of lines. Particularly, in a case of a linear sensor applied to a bar-code reader, since the aperture size of 1 pixel is as large as 14 $\mu$m×200 $\mu$m and, therefore, the initial charges in the light-receiving regions 101 also accumulated in a great amount upon rising the power supply, so that the start up of the device till it operates normally after discharging the initial charges is extremely delayed. By the way, the aperture size for one pixel of a usual linear sensor is smaller, for example, as about 7 $\mu$m×7 $\mu$m or 14 $\mu$m×14 $\mu$m as compared with a linear sensor used for the bar-code reader.

However, in a case of the bar-code reader, since the power supply is kept off during a stand-by state and reading has to be started instantly when a user turns on a power supply switch immediately before the use, so that it is necessary to rapidly read a bar code when the power supply turns on.

In view of the above in the existent CCD linear sensor, as shown in FIG. 11, it is adapted to rapidly discharge the initial charges by high speed transfer of the signal charges by making the frequency for the $\phi$H1 and $\phi$H2 higher than the frequency in usual transfer for a certain period of time after turning on of the power supply.

However, in the linear sensor of the structure in which the initial charges are discharged in a high speed transfer mode upon turning on of the power supply as described above, since two kinds of transfer clocks $\phi$H1 and $\phi$H2, that is, at high frequency for high speed transfer mode and at low frequency for usual transfer mode are necessary, so that a timing generator for generating such clocks is necessary to bring about a problem of complicating the constitution and increasing the cost.

Further, since there is also a limit for increasing the frequency for the transfer clocks $\phi$H1 and $\phi$H2 in the high speed transfer mode, there is a limit for shortening the period of time to transfer to the normal operation after turning on of the power supply.

SUMMARY OF THE INVENTION

The present invention has been accomplished in view of the foregoing problems and an object thereof is to provide a solid state image pickup device capable of transferring to a normal operation in a short period of time upon rising the power supply with a simple constitution, without providing a driving system with a function such as high speed transfer.

The foregoing object of the present invention can be attained in accordance with the present invention by a solid state image pickup device comprising a sensor section having a plurality of light-receiving regions for converting an incident light into signal charges of an amount corresponding to the amount of the light and storing the same, a charge transfer register for transferring signal charges read out from each of the light-receiving regions in the sensor section, charge discharging section for discharging the charges stored in each of the light-receiving regions and a control means for controlling such that the charges stored in each of the light-receiving regions are discharged to the charge discharging section within a certain period of time upon rising the power supply.

In the solid state image pickup device of the foregoing constitution, each of the light-receiving regions of the sensor section is overflown with unnecessary initial charges before turning on of the power supply. The initial charges are forcibly discharged under the control by the control means to the charge discharging section upon rising the power supply.

In this instance, since the initial charges in each of the light-receiving regions are discharged. simultaneously to the charge discharging section, it can rapidly transfer to a state capable of correctly reading out the signal charges upon rising the power supply.

DESCRIPTION OF THE PREFERRED EMBODIMENTS

Descriptions will be made to preferred embodiments according to the present invention in details with reference to the drawings.

Figure 1:
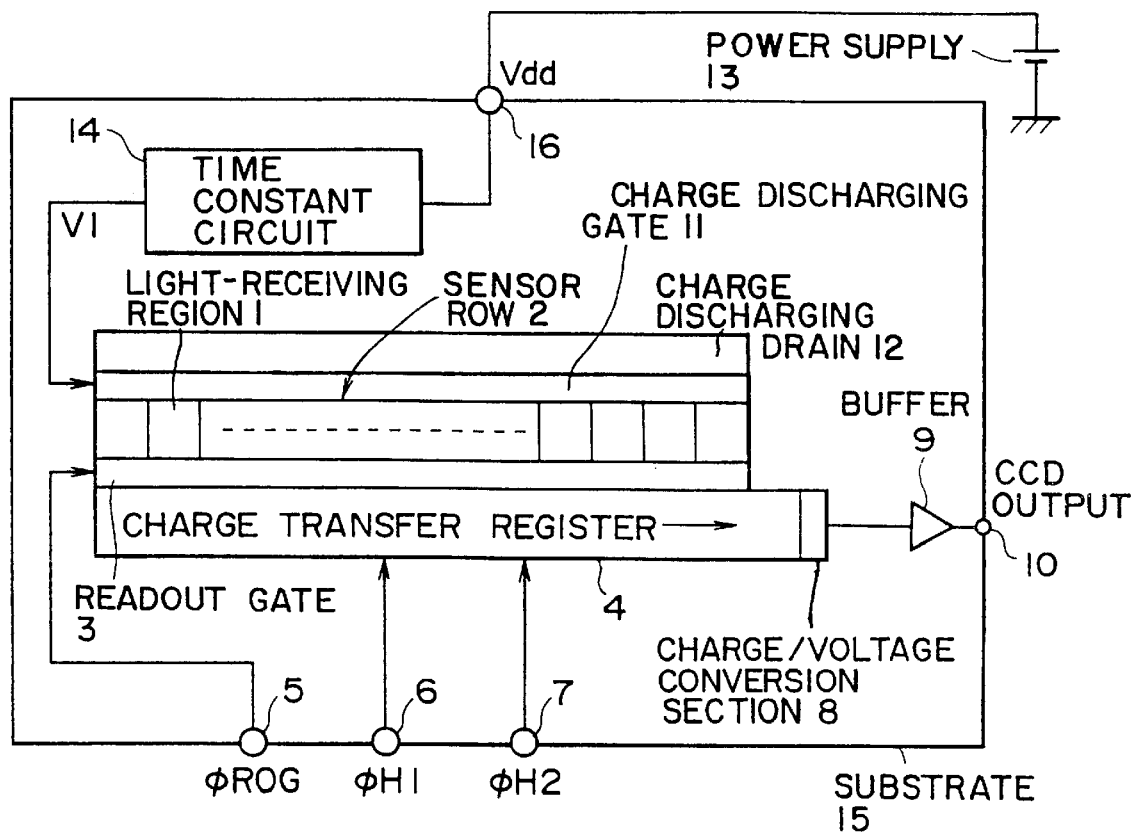
FIG. 1 is a view illustrating a constitution of a first embodiment according to the present invention.

FIG. 1 is a view illustrating the constitution of a first embodiment according to the present invention. In FIG. 1, light-receiving regions (pixels) comprising, for example, photodiodes are arranged in plurality in a row (for example by 2,000 pixels), for converting an incident light into signal charges of an amount corresponding the amount of the light and storing them to constitute a sensor row 2.

Signal charges stored in each of the light-receiving regions 1 of the sensor row 2 are read out simultaneously by way of a readout gate 3 to a charge transfer register 4. The readout gate 3 is supplied with a readout pulse φROG by way of a clock terminal 5.

On the other hand, the charge transfer register 4 is supplied with 2 phase transfer clocks φH1 and φH2 through clock terminals 6 and 7. The charge transfer register 4 comprises a CCD and transfers the signal charges read out from each of the light-receiving regions 1 in one direction (rightward in the figure) under 2 phase driving by the 2-phase transfer clocks φH1 and φH2.

A charge/voltage conversion section 8, for example, of a floating diffusion constitution is disposed at the final stage of the charge transfer register 4 for detecting the transferred signal charges and converting them into a voltage. The output voltage from the charge/voltage conversion section 8 is led out by way of a buffer 9 from an output terminal 10 as a CCD output. Thus, a CCD linear sensor, for example of 2,000 pixels is constituted.

Further, in this embodiment, a charge discharging drain 12 is formed by way of the charge discharging gate 11 to the sensor row 2 on the side opposite to the charge transfer register 4. The charge discharge gate 11 is usually in a low potential state and functions as a potential barrier for each of the light-receiving regions 1 of the sensor row 2.

The charge discharging gate 11 is supplied with a control voltage V1 for a predetermined period of time from a time constant circuit 14 as a control means upon rising of a DC power supply (device power supply) 13.

The time constant circuit 14 is formed on a substrate 15 identical with that for the sensor row 2 or the charge transfer register 4, etc. (on tip), and it outputs the control voltage V1 for a certain period of time in response to a power supply voltage Vdd applied from the DC power supply through a power supply terminal 16.

Figure 2:
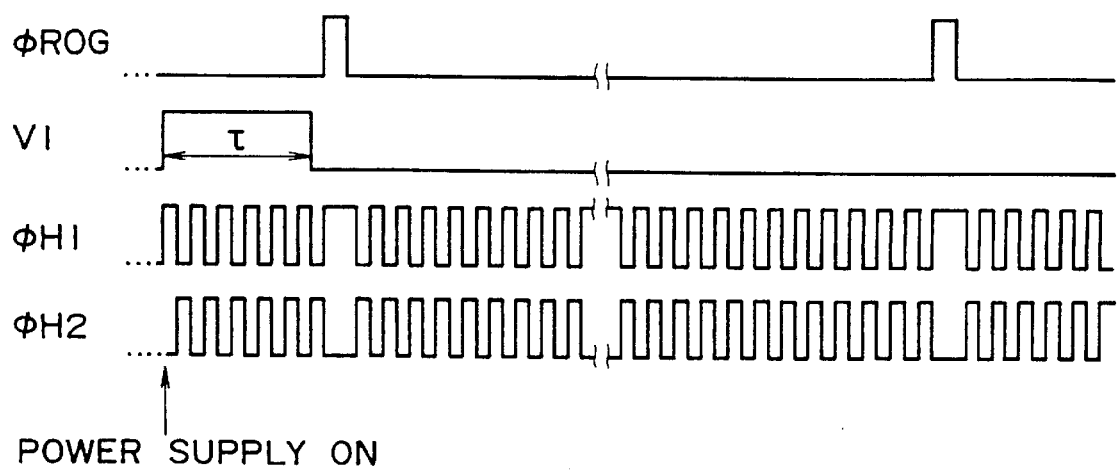
FIG. 2 is a timing chart for the first embodiment.

Descriptions will then be made to the operation of the CCD linear sensor according to the first embodiment as described above with reference to a timing chart shown in FIG. 2.

In this CCD linear sensor, unnecessary charges are stored as initial charges in each of the light-receiving regions 1 of the sensor row 2 before turning on of the power supply. When the power supply is turned on in this state, the control voltage V1 is outputted from the time constant circuit 14 for a predetermined period of time σ (for example, about 1 ms) in response to the power supply voltage Vdd applied through the power supply terminal 16.

The control voltage V1 is applied to the charge discharging gate 11. Then, the potential of the charge discharging gate 11 functions so far as the potential barrier to each of the light-receiving regions 1 of the sensor row 2 becomes high by the application of the control voltage V1.

Thus, the initial charges stored in each of the light-receiving regions 1 of the sensor row 2 are discharged by way of the charge discharging gate 11 to the charge discharging drain 12.

After elapse of the certain period of time σ from the turning on of the power supply, the control voltage V1 disappears. Then, the potential of the charge discharging gate 11 becomes lowered and the gate 11 functions again as the potential barrier to each of the light-receiving regions 1 of the sensor row 2.

Subsequently, signal charges corresponding to the image information to be read (bar code information in a case of using as an image sensor for the bar-code reader) are stored in each of the light-receiving regions 1 of the sensor row 2.

The signal charges stored in each of the light-receiving regions 1 of the sensor row 2 are simultaneously read out to the charge transfer register 4 under the application of the readout pulse φROG to the readout gate 3 and then transferred successively when the charge transfer register 4 undergoes 2-phase driving by the transfer clocks φH1 and φH2.

Then, they are converted into a voltage by the charge/voltage conversion section 8 and read out by way of the buffer 9 from the output terminal 10 as the CCD output.

As described above, since the charge discharging gate 11 and the charge discharging drain 12 are formed in the sensor row 2 on the side opposite to the charge transfer register 4, and the control voltage V1 is applied to the charge discharging gate 11 from the time constant circuit 14 for a certain period of time upon rising the power supply, the unnecessary initial charge stored in each of the light-receiving regions 1 can be discharged rapidly to the charge discharging drain 12 before turning on of the power supply.

This enables rapid transfer to the normal operation upon rising of the power supply by a simple structure.

When the initial charges are discharged upon rising the power supply, it is not always necessary to discharge all the initial charges and, if the initial charge can be discharged more or less, a corresponding effect can be obtained.

Further, when the readout pulse φROG is applied to the readout gate 11 and the transfer clocks φH1 and φH2 are applied to the charge transfer register 4 to conduct usual readout/transfer operation in parallel upon discharging operation of the initial charges, the initial charges can be discharged not only from the charge discharging gate 11 but also from the readout gate 11.

Figure 3:
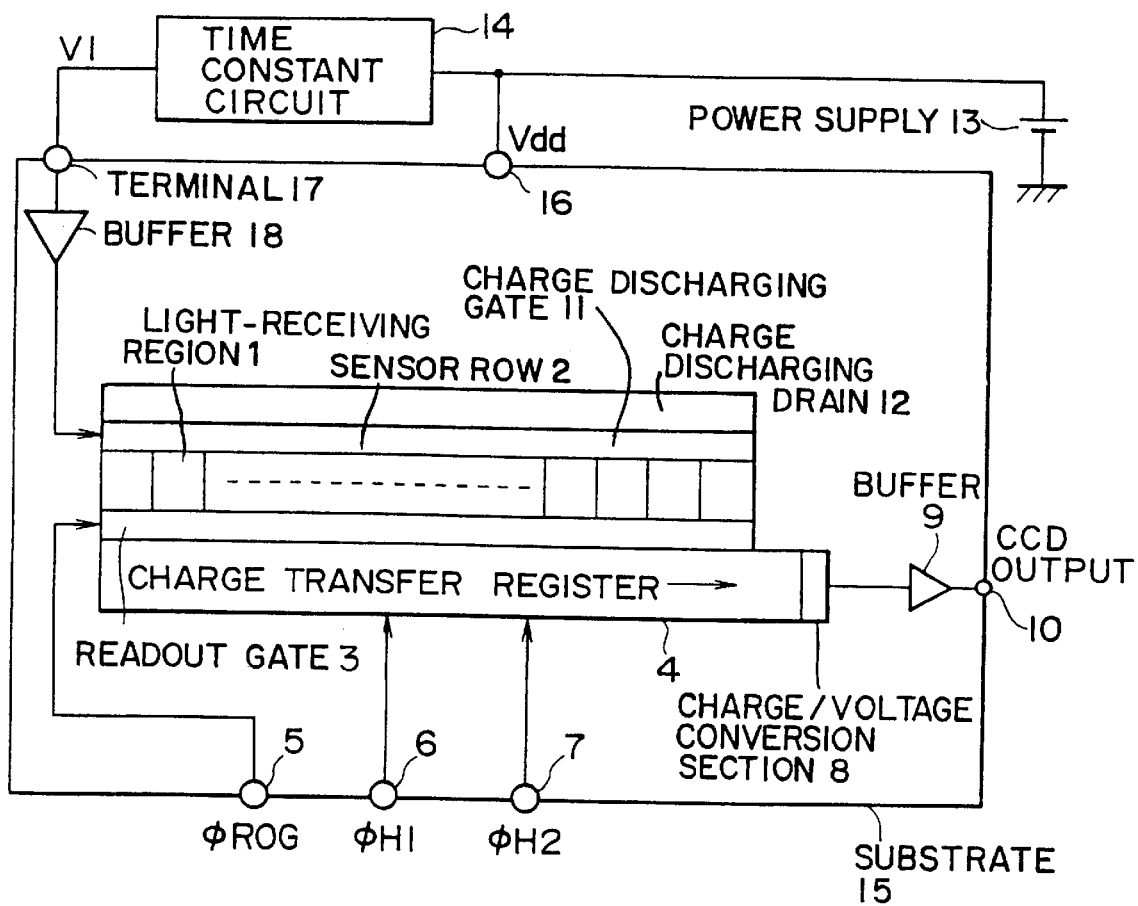
FIG. 3 is a view illustrating the constitution of a second embodiment according to the present invention.

FIG. 3 is a view illustrating the constitution of a second embodiment according to the present invention in which sections corresponding to those in FIG. 1 carry the same reference numerals.

In this second embodiment, a time constant circuit 14 is formed outside a substrate 15 and a control voltage V1 outputted from the time constant circuit 14 in response to rising of a DC voltage Vdb is taken by way of a control terminal 17 into the substrate 15 and, further, applied by way of a buffer 18 for processing such as waveform shaping to a charge discharging gate 11. Other constitutions are the same as those in the first embodiment.

Figure 4:
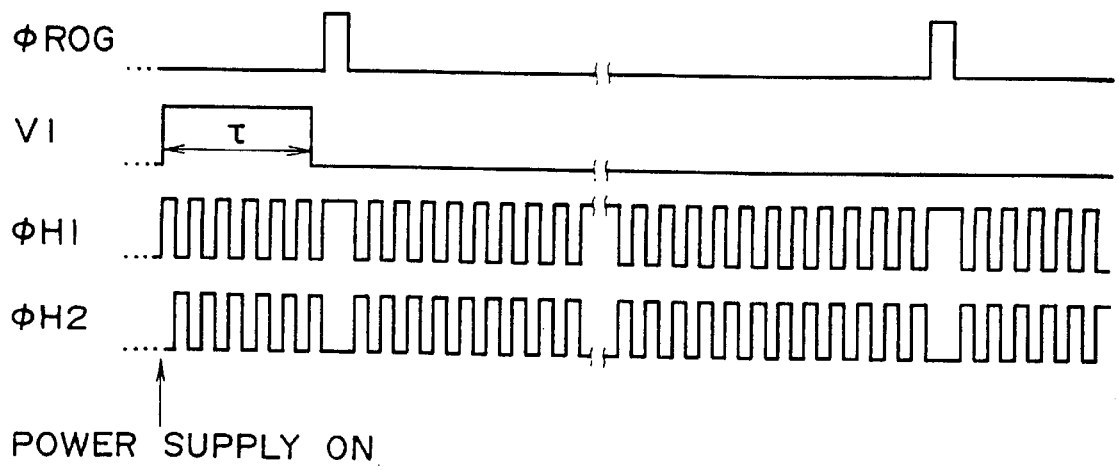
FIG. 4 is a timing chart for the second embodiment.

Accordingly, the operation of the second embodiment having the foregoing constitution is quite identical with that in the first embodiment and can provide the same effect. FIG. 4 is a timing chart for the second embodiment.

In the second embodiment, the control voltage V1 taken through the control terminal 17 into the substrate 15 is applied by way of the buffer 18 to the charge discharging gate 11. If processing such as waveform shaping is not necessary, it may be applied directly to the charge discharging gate 11 not by way of the buffer 18.

Figure 5:
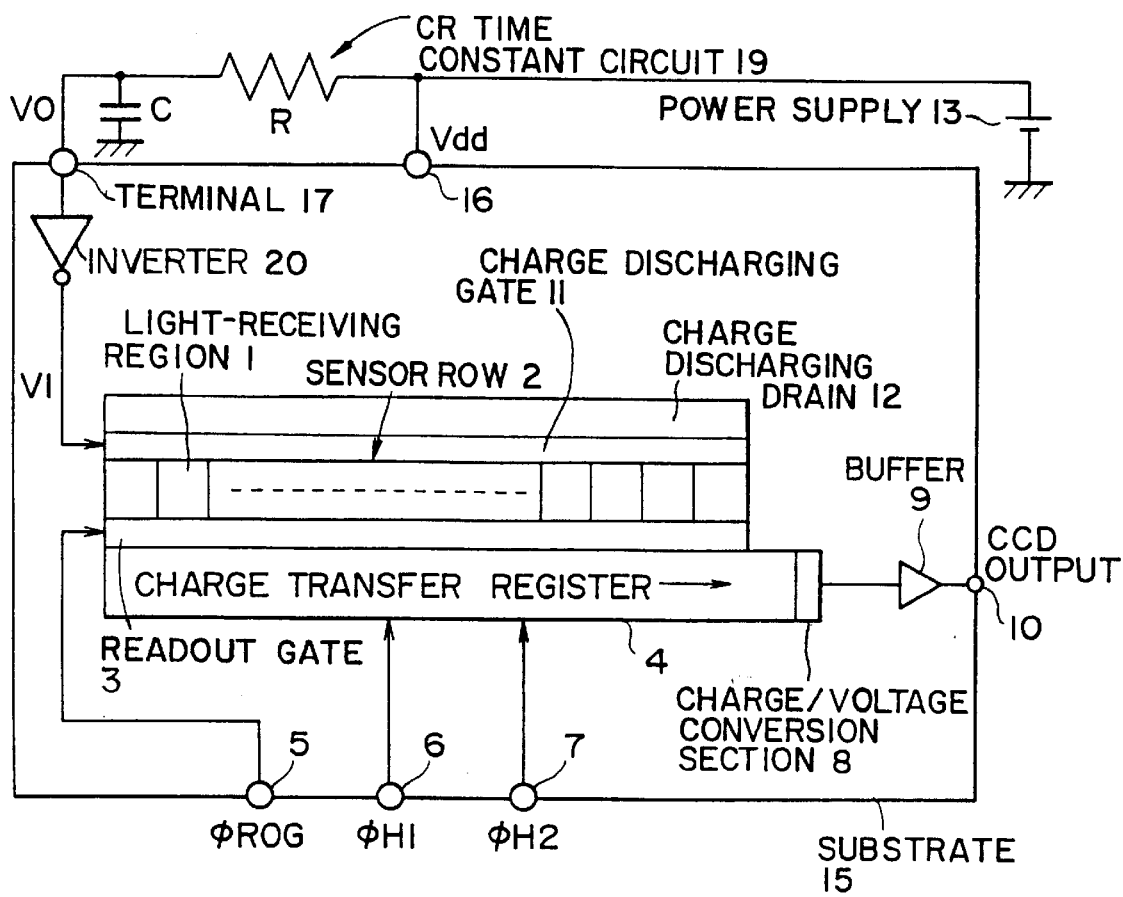
FIG. 5 is a view illustrating the constitution of a third embodiment according to the present invention.

FIG. 5 is a view illustrating the constitution of a third embodiment according to the present invention in which sections corresponding to those in FIG. 3 carry the same reference numerals.

In this third example, a CR time constant 19 comprising a capacitor C connected between a control terminal 17 and the ground and a resistor R connected at one end to the control terminal 17 and applied at the other end with a power supply voltage Vdd is used, instead of the time constant circuit 14 in the second embodiment.

Further, the output voltage V0 of the CR time constant circuit 19 is taken by way of the control terminal 17 into a substrate 15 and then applied by way of an inverter 20 to the charge discharge gate 11. In this case, the power supply voltage rising characteristic of the CR time constant circuit 19 is represented as:

$$V(t)=Vdd \cdot (1-\exp(-t/CR))$$

The inverter 20 is disposed for waveform shaping.

Figure 6:
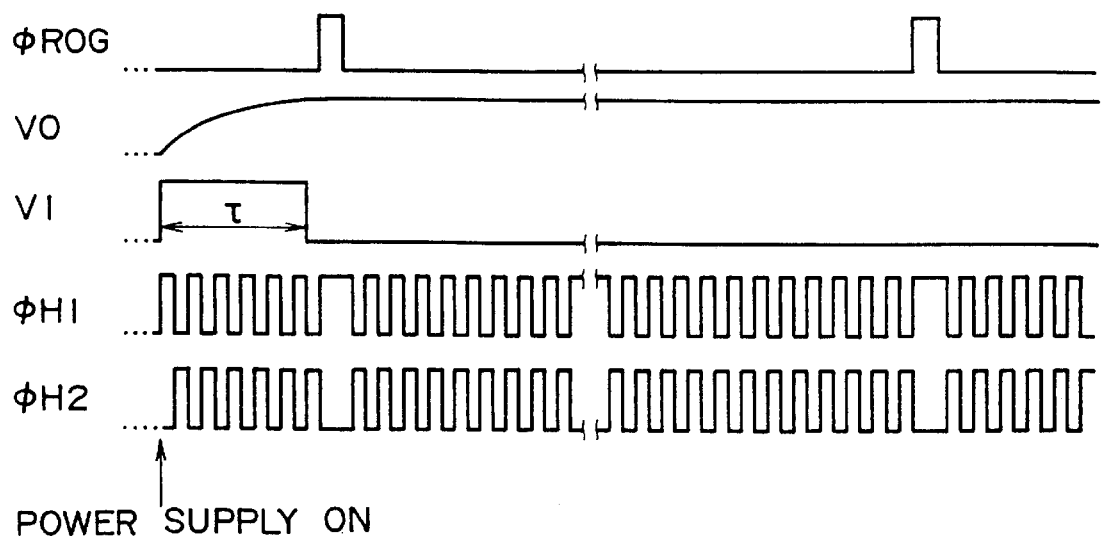
FIG. 6 is a timing chart for the third embodiment.

Then, description will be made to the operation of the CCD linear sensor according to the third embodiment having the foregoing constitution with reference to a timing chart shown in FIG. 6.

At first, when the power supply is turned on, the output voltage V0 of the CRT time constant circuit 19 gradually increases in response thereto at a power supply voltage rising characteristic represented by the equation 1. Further, the control voltage V1 as the output voltage of the inverter 20 receiving the output voltage V0 at the input rises substantially upon tuning on of the power supply.

When the control voltage V1 is applied to the charge discharging gate 11, the potential of the charge discharging gate 11 that has functioned so far as the potential barrier to each of the light-receiving regions 1 of the sensor row 2 is increased by the application of the control voltage V1.

Thus, the initial charges stored in each of the light-receiving regions 1 of the sensor row 2 are discharged by way of the charge discharging gate 11 to the charge discharging drain 12.

When the output voltage V0 of the CR time constant circuit 19 rises and reaches a threshold level of the inverter 20 with lapse of a certain period of time r from the instance the power supply turns on, the output of the inverter 20 is inverted to eliminate the control voltage V1. Then, the potential of the charge discharging gate 11 is lowered and it functions again as the potential barrier to each of the light-receiving regions 1 of the sensor row 2. Subsequently, signal charges corresponding to the bar code information are stored in each of the light-receiving regions 1 of the sensor row 2.

Usual readout/transfer of the signal charges from each of the light-receiving regions 1 of the sensor row 2 are conducted in the same manner as in the first embodiment.

In this third embodiment, the CRT time constant circuit 19 is disposed outside the substrate 15 but it may be disposed also in an on-chip manner like that in the first embodiment.

On the contrary, the inverter 20 is disposed on-chip but it may be disposed outside the substrate 15. However, if it is disposed out of the substrate 15, an additional power supply for the inverter 20 is required and, therefore, on-chip arrangement is preferred.

Figure 7:
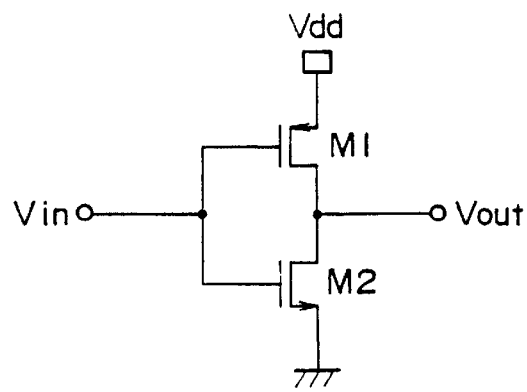
FIG. 7 is a circuit diagram illustrating an example of a circuit structure of an inverter.

FIG. 7 is a circuit diagram illustrating an example of a circuit structure for the inverter 20. As shown in the figure, the inverter 20 has a CMOS structure comprising a P-channel MOS transistor M1 and an N-channel MOS transistor M2 connected in series between a power supply Vdd and the ground.

Then, they are wired such that an input voltage Vin is applied to a common junction for each gate of both MOS transistors M1 and M2, and an output voltage Vout is led out from the common junction for each of the drains.

Figure 8:
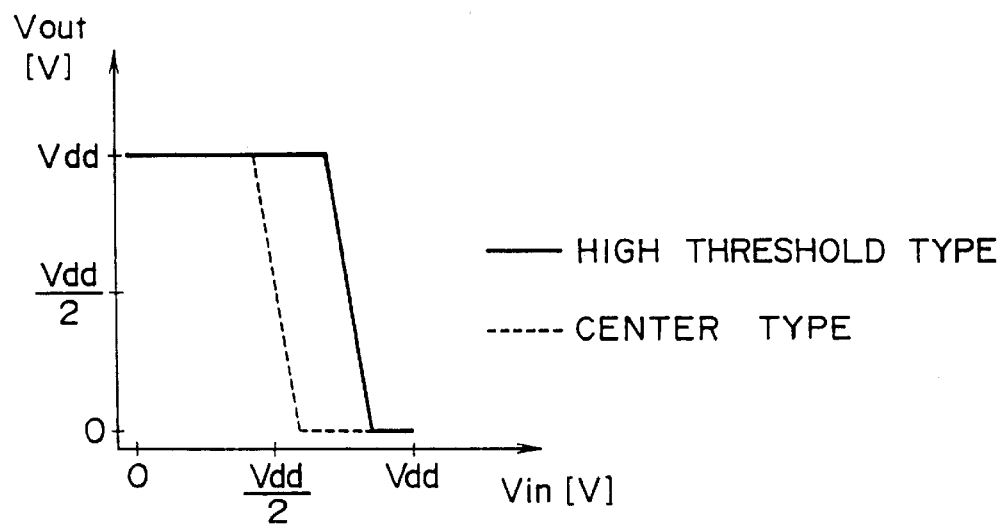
FIG. 8 is a characteristic view showing an input/output characteristic of the inverter.

In a case of using the inverter of this kind to a usual logic circuit, it is general to constitute the inverter as a so-called center type inverter showing an input/output characteristic as shown by the broken line in FIG. 8 in which a threshold level is set to about ½ of the power supply voltage Vdd (Vdd/2). On the other hand, in this embodiment, it is constituted as a so-called high threshold type inverter showing an input/output characteristic as shown by the solid state line in FIG. 8 in which the threshold level is set to higher than ½ of the power supply voltage Vdd.

Figure 9:
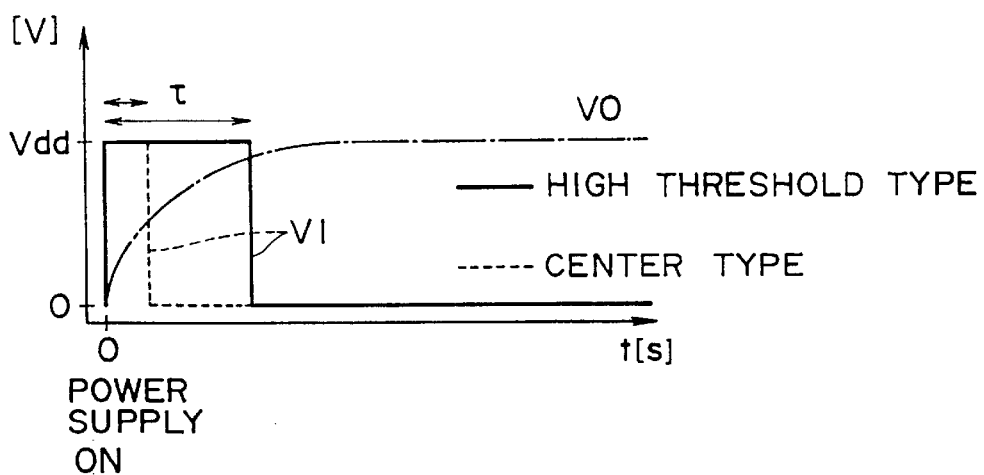
FIG. 9 is a waveform chart showing an output waveform of an inverter upon rising a power supply.
Figure 10:
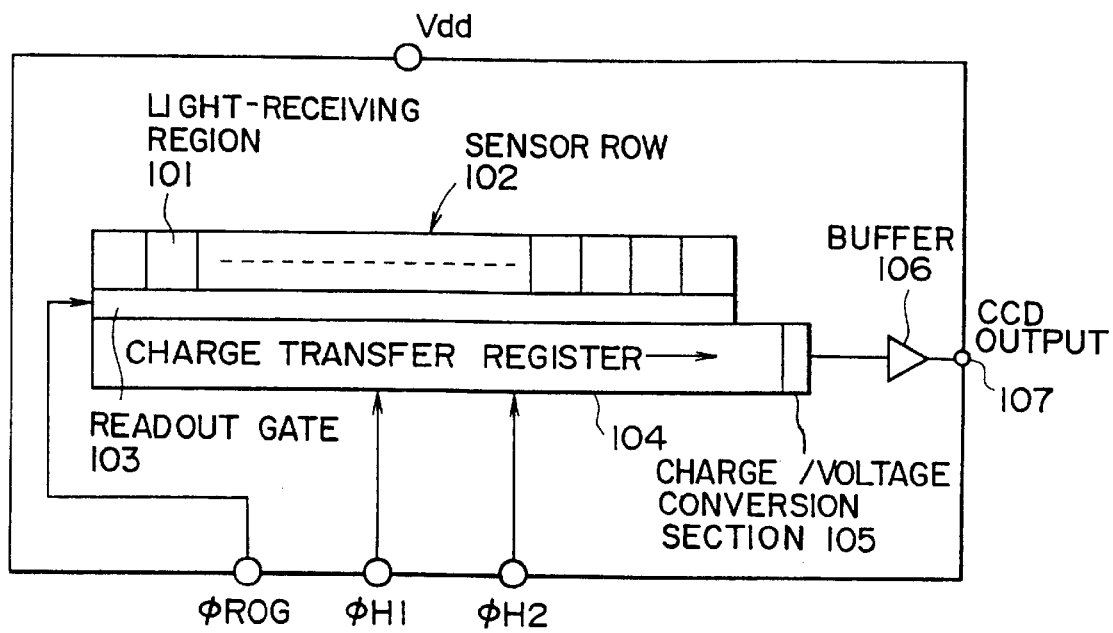
FIG. 10 is a view showing the constitution of the related art.
Figure 11:
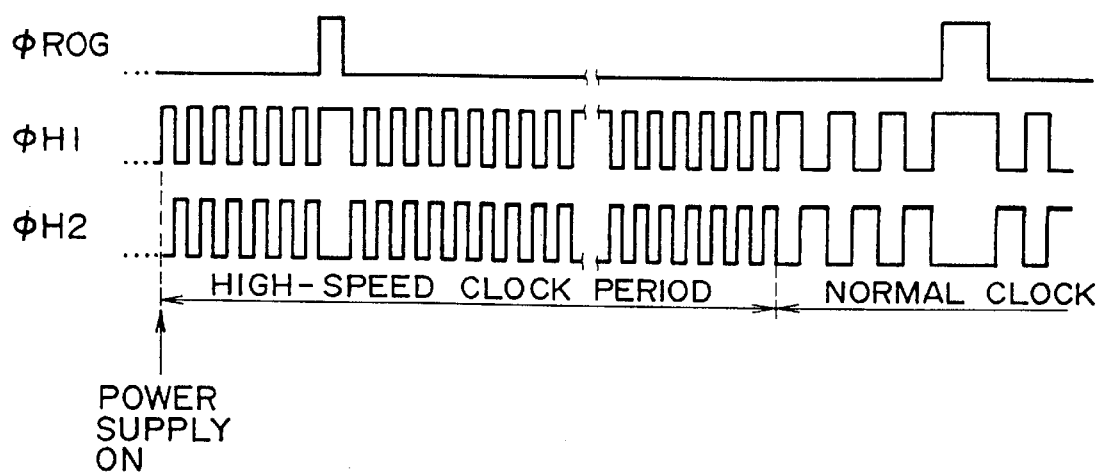
FIG. 11 is a timing chart for the related art.

Since the inverter 20 is constituted as the high threshold type inverter, a predetermined period of time σ can be set larger as compared with a case of the center type inverter constitution without increasing values for the capacitor C and the resistor R of the CR time constant circuit 19 as can be seen from the waveform chart in FIG. 9.

In other words, assuming an identical certain period of time, the values for the capacitor C and the resistor R of the CR time constant circuit 19 can be made smaller than in the case of the center type inverter, so that inexpensive parts can be used to provide an economical advantage. As an example, an expensive electrolytic capacitor or tantalum capacitor has to be used in a case of a large capacitance value but an inexpensive ceramic capacitor may suffice in a case of a smaller capacitance value.

In a case of constituting the inverter 20 as the high threshold type constitution, the P-channel MOS transistor M1 and the N-channel MOS transistor M2 may be set such that the mutual conductance $g_{m1}$ and $g_{m2}$ may be set as $g_{m1}$ $g_{m2}$, specifically, $g_{m2}/g_{m1}$ is about from ½ to ¹⁄₁₀.

Further, the $g_{m2}/g_{m1}$ ratio may be changed by, for example, changing w (channel width)/L (channel length) that is a parameter representing each of the gains for the P-channel MOS transistor M1 and the N-channel MOS transistor M2.

In this embodiment, the CMOS structure is used for the inverter 20 but this is not limitative and an inverter of other constitutions such as E/D constitution or E/E constitution using N-channel MOS may be used and, further, a Schmitt trigger inverter resistant to noises may be used.

Also in a case of using such inverters, the same effect as described above can be obtained by constituting them as the high threshold type inverter.

In each of the embodiments, the charge discharging gate 11 and the charge discharging drain 12 are additionally disposed for discharging unnecessary initial charges.

However, if it is applied to a linear sensor having a so-called electronic shutter function, since the shutter gate and the shutter drain can be used also as the charge discharging gate 11 and the charge discharging drain 12, the aimed object can be attained by a simple structure of only adding the time constant circuit.

Further, in each of the embodiments, a so-called lateral structure is adopted in which the initial charges in each of the light-receiving regions 1 of the sensor row 2 are discharged by way of the charge discharging gate 11 to the charge discharging drain 12. However, it may be a so-called vertical constitution of discharging the initial charges to the substrate 15 by applying the control voltage V1 to the substrate 15.

Further, the present invention is not always restricted to the application to the CCD linear sensor but it is applicable to all solid state image pickup devices including area sensors not restricted only to CCD.

As has been explained above, according to the present invention, since the charge discharging section for discharging the charges stored in each of the light-receiving regions of the sensor section is disposed and unnecessary initial charges are forcibly discharged to the charge discharging section upon rising of the device power supply, it can rapidly transfer to the normal operation upon rising the power supply with a simple structure without providing the driving system with a function such as high speed transfer.

What is claimed is:

1. A method for controlling a charge-coupled device (CCD) that is powered by a power supply which produces a power signal and that includes a sensor section having a plurality of light-receiving regions such that each of the light-receiving regions converts an incident light into signal charges of an amount corresponding to the amount of the incident light, a charge transfer register for transferring the signal charges read out from said each light-receiving region of the sensor section, and a charge discharging section for discharging initial charges stored in said each light-receiving region of the sensor section, said sensor section, said charge transfer register and said charge discharging section all receiving the same power signal from said power supply, said method comprising the steps of:

activating said power supply;

generating a control signal of a predetermined duration in response to said power supply being activated; and supplying said control signal to said charge discharging section such that the initial charges stored in said each light-receiving region are discharged to said charge discharging section during said predetermined signal duration.

2. The method according to claim 1, wherein said charge discharging section includes a gate section and a drain section which is formed in said sensor section on a side opposite said charge transfer register, said method further comprising controlling said gate section to discharge charges stored in said each light-receiving region of said drain section.

3. The method according to claim 2, further comprising supplying said control signal to said gate section for a preselected period of time.

4. The method according to claim 2, further comprising increasing said control signal as a function of a predetermined time constant in response to a rising voltage from said power supply, inverting said control signal above a preselected threshold level for setting a predetermined period of time, and applying the inverted control signal to said gate section.

5. The method according to claim 4, wherein said preselected threshold level is set to a value higher than ½ of the power supply voltage.

6. The method according to claim 1, wherein the light-receiving regions are arranged in a one-dimensional line.

7. The method according to claim 2, wherein the incident light is a reflection light of a light irradiated from a light source to a bar code appended to a medium.

* * * * *